United States Patent
Khan et al.

(10) Patent No.: US 9,231,918 B2
(45) Date of Patent: Jan. 5, 2016

(54) USE OF VIRTUAL NETWORK INTERFACES AND A WEBSOCKET BASED TRANSPORT MECHANISM TO REALIZE SECURE NODE-TO-SITE AND SITE-TO-SITE VIRTUAL PRIVATE NETWORK SOLUTIONS

(71) Applicant: Cisco Technology, Inc., San Jose, CA (US)

(72) Inventors: Mohammed Baseer Khan, Santa Clara, CA (US); Sanju Abraham, Fremont, CA (US); Ajay Lele, Sunnyvale, CA (US); Nishant Suneja, San Jose, CA (US); Rajesh Kumar, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 13/770,247

(22) Filed: Feb. 19, 2013

(65) Prior Publication Data

US 2014/0237585 A1 Aug. 21, 2014

(51) Int. Cl.
*H04L 29/06* (2006.01)
*H04L 29/08* (2006.01)

(52) U.S. Cl.
CPC ............ *H04L 63/0272* (2013.01); *H04L 63/16* (2013.01); *H04L 67/02* (2013.01); *H04L 63/0869* (2013.01)

(58) Field of Classification Search
None
See application file for complete search history.

(56) References Cited

U.S. PATENT DOCUMENTS

| | | | |
|---|---|---|---|
| 8,095,786 B1 * | 1/2012 | Kshirsagar | H04L 63/0272 713/151 |
| 8,180,901 B2 | 5/2012 | Bagepalli et al. | |
| 8,295,306 B2 | 10/2012 | Bagepalli et al. | |
| 2007/0150946 A1 * | 6/2007 | Hanberger | H04L 63/0272 726/15 |
| 2009/0138962 A1 * | 5/2009 | Nagy et al. | 726/15 |
| 2012/0066489 A1 * | 3/2012 | Ozaki et al. | 713/151 |
| 2012/0278878 A1 * | 11/2012 | Barkie et al. | 726/15 |
| 2013/0340067 A1 * | 12/2013 | Lindteigen | H04L 63/0272 726/15 |

OTHER PUBLICATIONS

Doraswamy et al., IPSec—The New Security Standard for the Internet, Intranets, and Virtual Private Networks, Chapter 2, 2003, Prentice Hall, $2^{nd}$ Edition, pp. 59-81.*
Fette et al., RFC 6455—The WebSocket Protocol, 2011.*

* cited by examiner

*Primary Examiner* — Minh Dinh
(74) *Attorney, Agent, or Firm* — Edell, Shapiro & Finnan, LLC

(57) ABSTRACT

Techniques are provided herein for enabling a virtual private network (VPN) using a bidirectional, full duplex transport channel configured to send and receive application layer data packets. At a source network device that hosts a VPN client, the VPN client is configured with a bidirectional, full duplex transport channel that is configured to send and receive Open Systems Interconnection application layer data packets. The VPN client is also configured with a virtual network interface that operates to virtually link the VPN client with the transport channel.

24 Claims, 9 Drawing Sheets

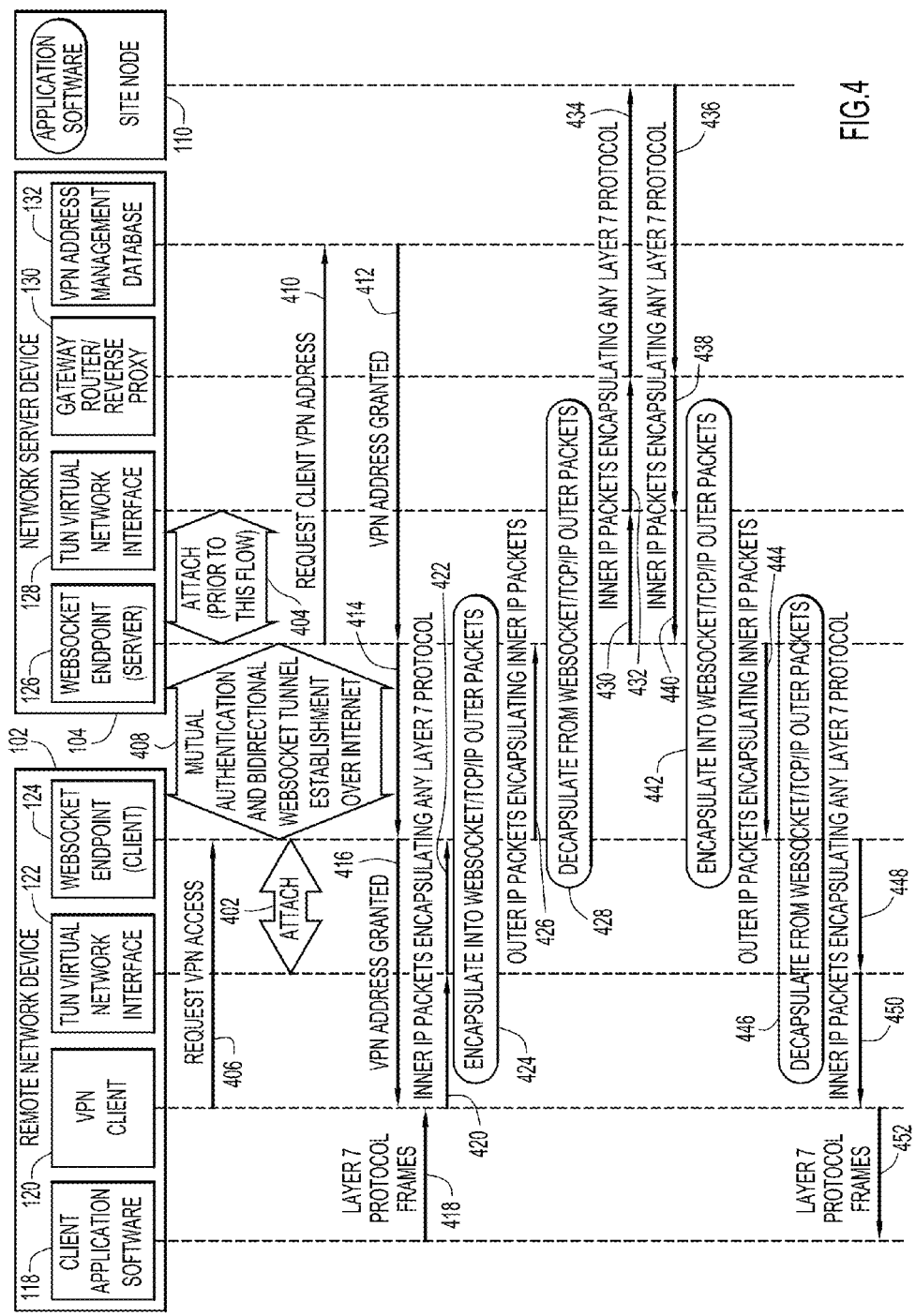

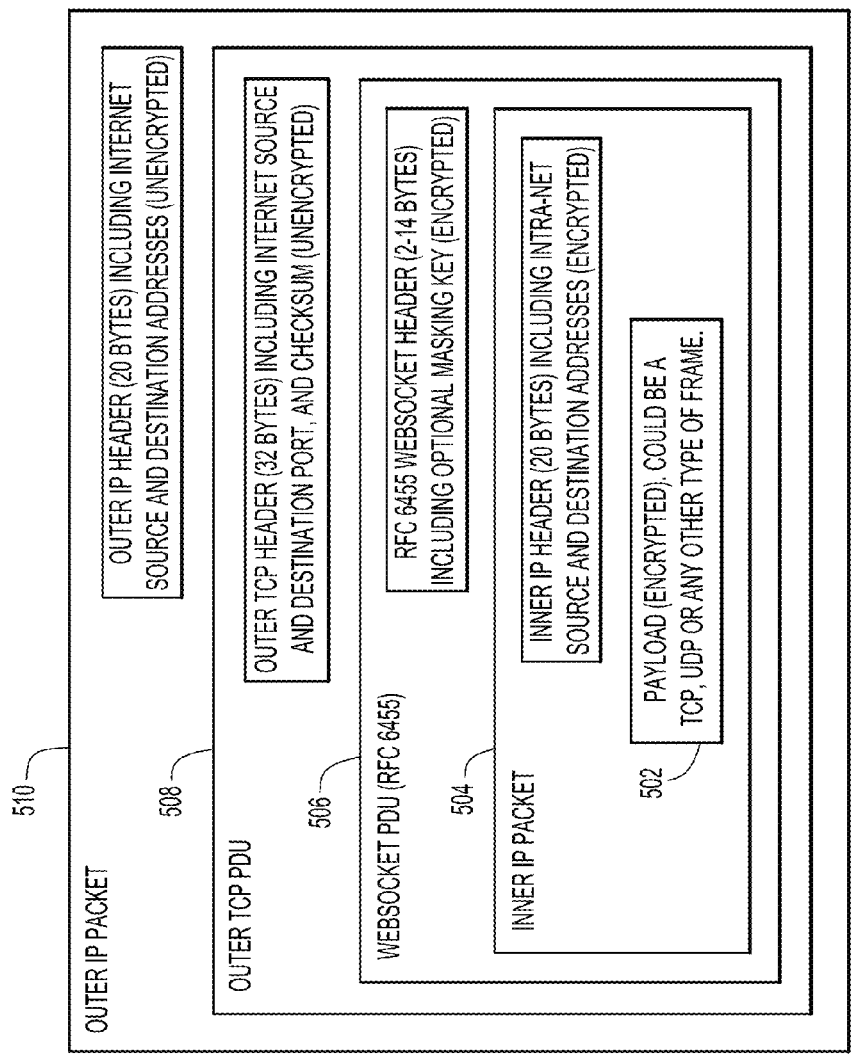

|  | WEBSOCKET VPN (TCP ONLY) | IPSEC VPN (TCP) | IPSEC VPN (UDP) | OPENVPN SSL VPN (TCP) | OPENVPN SSL VPN (UDP) |
|---|---|---|---|---|---|
| IPv4 HEADER | 20 BYTES | 20 BYTES | 20 BYTES | 20 BYTES | 20 BYTES |
| TCP OR UDP HEADER | 20 BYTES (TCP) | 20 BYTES (TCP) | 8 BYTES (UDP) | 20 BYTES (TCP) | 8 BYTES (UDP) |
| VPN-RELATED HEADER | 2 BYTES* | 10 BYTES ESP HEADER | 10 BYTES ESP HEADER | 21 BYTES | 21 BYTES |
| INTEGRITY CHECK (HMAC-SHA1-160) | 20 BYTES | 20 BYTES | 20 BYTES | 20 BYTES | 20 BYTES |
| TOTAL | 62 BYTES | 70 BYTES | 58 BYTES | 81 BYTES | 69 BYTES |

* THE PAYLOAD FIELD LENGTH MAY BE IGNORED SINCE INNER PACKETS DO NOT NEED TO STRADDLE MULTIPLE OUTER PACKETS.

FIG.6

USE OF VIRTUAL NETWORK INTERFACES AND A WEBSOCKET BASED TRANSPORT MECHANISM TO REALIZE SECURE NODE-TO-SITE AND SITE-TO-SITE VIRTUAL PRIVATE NETWORK SOLUTIONS

TECHNICAL FIELD

The present disclosure relates to providing secure network communications in virtual private network environments.

BACKGROUND

Network devices may communicate with each other along data paths in a network. As the network topology grows and more network devices are added to the network, secure and reliable communications between the network devices may be desired. In this regard, virtual private networks (VPNs) may be established in the network that include some of these network devices to ensure secure communications between the network devices. For example, a company or business may enable a VPN within its network, and a public network (e.g., the Internet) may be used to route communications between a remote device and devices within the company's VPN. Thus, remote devices can use "virtual" connections via a public network to connect and exchange secure communications with devices within a VPN. These communications can also be encrypted so that devices that are not authenticated or otherwise allowed to access the VPN are unable to decrypt and access the communications.

BRIEF DESCRIPTION OF THE DRAWINGS

FIG. 4 shows an example diagram depicting messages exchanged between a remote network device and a VPN hosting site across a bidirectional communication channel.

FIG. 5 shows an example packet exchanged between a remote network device and a VPN hosting site.

FIG. 6 shows an example chart showing a comparison of packet header sizes for different packets exchanged between a remote network device and a VPN hosting site.

DESCRIPTION OF EXAMPLE EMBODIMENTS

Overview

Figure 1:
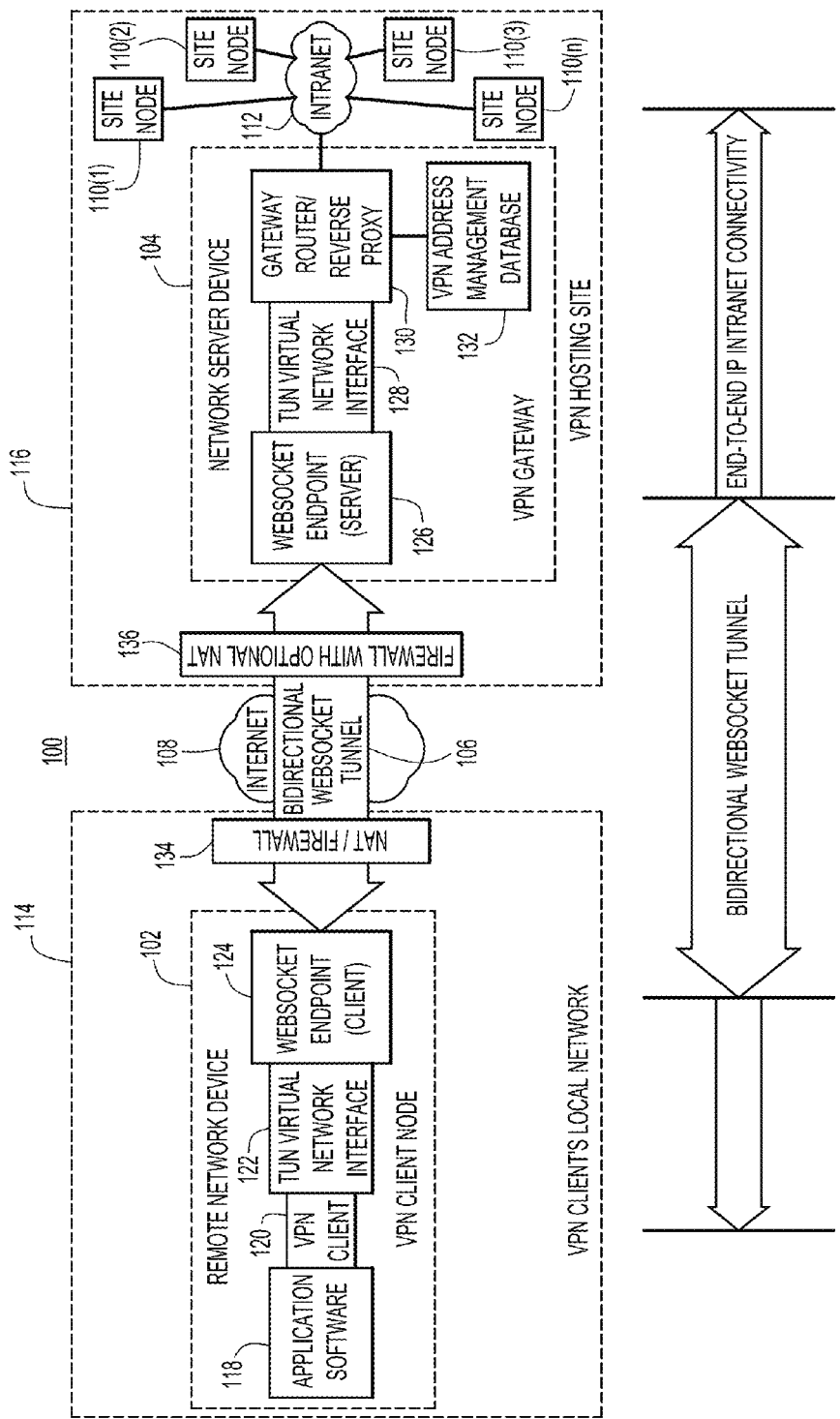
FIG. 1 shows an example network topology that enables secure node-to-site application layer communications exchanged along a bidirectional transport channel.

Techniques are provided hereinafter for enabling a virtual private network (VPN) using a bidirectional, full duplex transport channel configured to send and receive application layer data packets. The techniques may be embodied as a method, an apparatus or a computer readable media that is operable to perform the method. At a source network device that hosts a VPN client, the VPN client is configured to interface with a bidirectional, full duplex transport channel that is configured to send and receive Open Systems Interconnection application layer data packets. The VPN client is also configured with a virtual network interface that operates to virtually link the VPN client with the transport channel.

Example Embodiments

The techniques described hereinafter relate to enabling secure, bidirectional, application layer communications between network devices within a virtual private network (VPN). As will become apparent hereinafter, in one example, the techniques are particularly relevant for enabling a user to access devices and applications hosted by devices in a VPN remotely via the user's computing device (e.g., laptop, desktop computer, mobile device, tablet, etc.). The user is able to access the network devices and applications in the VPN via a public network (e.g., the Internet). As a result, the user is able to send and receive application layer communications via the user's computing device to the network devices across a single bidirectional communication link. For example, the user may launch an application (e.g., a web browser, a mobile device application, etc.) on a mobile device, and upon proper authentication, the user may be able to access the network devices remotely that are present within a VPN across a single bidirectional communication link. In one scenario, the user may be an employee who is "telecommuting" or "working remotely" and is accessing network devices or applications hosted by network devices in a VPN hosted by an employer's central servers.

Alternatively, in another example, the techniques in the present application are relevant for enabling two network sites to communicate with each other over a VPN in order to enable access devices and applications remotely and bidirectionally across a single communication link. For example, an enterprise may have several branch offices that are located in different locations. The network devices and servers in one branch office may use the techniques described hereinafter to send and receive secure, application layer communications with network devices and servers in another branch office across a single bidirectional communication link. For convenience, it should be appreciated that the descriptions hereinafter of communications between a remote network device and network devices and applications of a site at a different location are called "node-to-site" communications, while descriptions hereinafter of communications between one network site and another network site are called "site-to-site" communications. The techniques described hereinafter enable secure, bidirectional, application layer VPN communications between network devices in both node-to-site contexts and site-to-site contexts using, for example, WebSocket technology (described in the Internet Engineering Task Force (IETF) Request for Comments (RFC) 6455) together with Network Tunnel ("TUN") and Network Tap ("TAP") technology.

Reference is now made to FIG. 1, which shows an example network topology ("network") 100 depicting secure node-to-site communications exchanged along a bidirectional transport channel. It should be appreciated that hereinafter, the term "node-to-site communications" refers to secure, bidirectional, application layer communications from a remote network device 102 to a network server device 104 and from the network server device 104 to the remote network device 102. FIG. 1 shows a remote network device 102 (e.g., a laptop, desktop, mobile device, tablet, etc.) configured to exchange secure communications with a network server device 104 across a communication link 106, as described hereinafter. The network server device 104 is said to reside at a "host site" that is at a location different from the location of the remote network device 102. Communications between the remote network device 102 and the network server device 104 may be exchanged via the communication link 106 across a public network (e.g., the Internet), shown at reference numeral 108. The communications may be wireless communications or wired communications across, e.g., an Ethernet or Transmission Control Protocol (TCP) link.

The network server device 104 "serves" or manages a plurality of site nodes, shown at reference numerals 110(1)-110(n), via an internal network (e.g., an intranet) at the location of, or remote from, the network server device 104. The internal network at the site of the network server device 104 is shown at reference numeral 112. For example, the network server device 104 may be a server that manages a plurality of computing devices, software applications, etc. that are represented by the site nodes 110(1)-110(n). Thus, the site nodes 110(1)-110(n) are said to reside "behind" the network server device 104. In one example, some of the site nodes may represent physical computing devices while other site nodes may represent applications hosted in, e.g., software of physical computing devices. For example, site node 110(1) may represent a physical computer that is managed by the network server device 104, and site node 110(2) may represent an application (e.g., a word processing application, spreadsheet application, etc.) hosted by a physical computer at the host site.

In general, the remote network device 102, which resides in a local client network 114, exchanges communications with the network server device 104, which resides in a host site network 116, in order to access applications hosted or represented by one or more of the site nodes 110(1)-110(n) residing behind the network server device 104 according to the techniques described hereinafter. In order for the remote network device 102 to connect securely with site nodes 110(1)-110(n) at the host site network 116 via the network server device 104, a VPN may be established that includes the remote network device 102, the network server device 104 and one or more of the site nodes 110(1)-110(n) managed by the network server device 104. In other words, if the remote network device 102 is granted access rights to site nodes 110(1) and 110(2), but not site nodes 110(3) and 100(n), the VPN will include remote network device 102, network server device 104 and site nodes 110(1) and 110(2) (and if applicable, physical devices that host the site nodes 110(1) and 110(2)). It should be appreciated that any combination of site nodes and other network devices may comprise the VPN. Thus, even though the remote network device 102 is located remotely relative to the network server device 104 and the site nodes 110(1)-110(n), the remote network device 102 can access the network server device 104 and the appropriate site nodes 110(1)-110(n) via the VPN. In an example, an employee who is telecommuting with his or her place of employment may be able to access the various applications hosted/represented by the site nodes in the VPN at the host site.

The network device 102 can utilize its connection to the public network 108 (Internet) to connect to the VPN that includes the network server device 104 and the appropriate site nodes. For example, the remote network device 102 may be a wireless or mobile network device that is configured to connect with the Internet via a wireless or broadband service (e.g., 3G, 4G LTE, Wi-Fi®, etc.) and may launch application software 118 (e.g., a mobile phone application or web browser stored in software of the network device 102) to connect a VPN client 120 hosted by the remote network device 102 to the network server device 104 over the Internet. It should be appreciated that the network device 102 may host multiple VPN clients (e.g., in one or more virtual machines hosted by the network device 102) to initiate multiple VPN connections with the network server device 104 and the site nodes 110(1)-110(n).

In one example, the remote network device 102 (at the instruction of a user) may launch the application software 118, which may be, e.g., a web browser, mobile application or remote desktop client application to join the VPN. Upon doing so, the user of the remote network device 102 may be prompted to enter authentication information. For example, the user may enter a user name and password. The remote network device 102 then exchanges encrypted communications over the Internet with the network server device 104 in order to authenticate and confirm its eligibility with the network server device 104 to access the VPN. Ultimately, upon the remote network device 102 authenticating with the network server device 104 for access to the VPN, the remote network device 102 and the network server device 104 can exchange secure communications across a single bidirectional communication link. These secure communications may be application layer communications in accordance with the Open Systems Interconnection (OSI) layer 7 standard.

FIG. 1 also shows the remote network device 102 and the network server device 104 as being configured to host a plurality of modules in order to enable secure, bidirectional, application layer communications in a VPN. In particular, FIG. 1 shows the remote network device 102 hosting (e.g., in software or hardware components) application software 118, a VPN client module 120 ("VPN client"), a network tunnel (or "TUN") virtual network interface module 122 (referred to hereinafter as a "TUN virtual network interface"), and a transport channel module 124. The transport channel module 124 is referred to hereinafter as a "WebSocket endpoint," in accordance with the IETF RFC 6455 standard. The network server device 104 is configured to host a WebSocket endpoint 126, a TUN virtual network interface 128, a gateway router/reverse proxy 130 and a VPN address management interface 132. These modules enable the secure, bidirectional application layer communications between the remote network device 102 and the remote server device 104 as described hereinafter. FIG. 1 also shows a network address translator (NAT)/firewall module 134 at the VPN client local network 114 and a firewall with an optional NAT 136 at the VPN hosting site 116.

The WebSocket endpoints 124 and 126 in the remote network device 102 and the network server device 104 enable secure, bidirectional communications between the devices across the Internet via a single link (e.g., a single TCP link). Traditionally, if these devices are not configured with WebSocket endpoints, when the remote network device 102 and the network server 104 exchange communications with each other, the communications are exchanged over multiple half-duplex (or "one way") TCP communication links. That is, if the remote network device 102 were to communicate with the network server device 104 without either device being "WebSocket enabled," the communication from the remote network device 102 would be sent to the network server device 104 along a first half-duplex TCP communication link that would route communications only in one direction from the remote network device 102 to the network server device 104.

Likewise, if the network server device 104 responds to the communication from the remote network device 102, the network server device 104 would send the response communications to the remote network device 102 along a second half-duplex TCP communication link that would route communications only in one direction from the network server device 104 to the remote network device 102. Thus, when the remote network device 102 is not configured with the WebSocket endpoint 124 and when the network server device 104 is not configured with the WebSocket endpoint 126, communications exchanged between the remote network device 102 and the network server device 104 are exchanged over a plurality of half-duplex TCP communication links. The number of these TCP communication links and requirement for multiple TCP ports to create the TCP links complicates the network topology between the remote network device 102 and the network server device 104 and limits the scalability of the network 100 when other network devices attempt to communicate with the network server device 104 via the Internet.

Thus, the WebSocket standard, as described by IETF RFC 6455 offers a solution to simplify the network topology by moving away from the traditional request-response communications across multiple half-duplex TCP links in traditional environments (e.g., Hyper Text Transfer Protocol (HTTP) and Secure HTTP (HTTPS) communications). That is, once a WebSocket connection is established between the remote network device 102 and the network server device 104, WebSocket data payloads can be sent between the devices in a full-duplex ("two way") mode with minimal framing. For example, when the remote network device 102 and the network server device 104 are configured with corresponding WebSocket clients 124 and 126, communications between the remote network device 102 and the network server device 104 can be exchanged across a single TCP link in both directions.

It should be appreciated that though WebSocket enables bidirectional communications between the remote network device 102 and the network server device 104, the bidirectional communications terminate at the remote network device 102 and the network server device 104. Thus, in order for the remote network device 102 to exchange bidirectional communications securely with the one or more site nodes 110(1)-110(n) that reside behind the network server device 104, a VPN must be established that includes the remote network device 102, the network server device 104 and the relevant site nodes. The establishment of the VPN, in connection with WebSocket enables these secure bidirectional communications.

As stated above, the remote network device 102 may utilize its connection to the Internet to connect to a VPN that includes the network server device 104 and one or more of the site nodes hosted by the network server device 104. For example, the remote network device 102 may want to exchange communications securely with the network server device 104 and one or more of the site nodes hosted by the network server device 104. It may be desirable for these communications to be encrypted, such that an unauthorized party or malicious third-party entity cannot snoop or otherwise detect and decrypt the communications between the remote network device 102 and the network device 104. Thus, by connecting using a VPN via the Internet, the remote network device 102 can ensure that its communications with the network server device 104 are secure while maintaining ease of access by connecting via the publically available network (Internet). As stated above, the remote network device 102 and the network server device 104 are WebSocket enabled devices, and thus, the communications between these devices via the Internet can be exchanged via the bidirectional communication link ("bidirectional WebSocket Tunnel) 106.

The remote network device 102 and the network server device 104 are configured to exchange communications in accordance with the OSI layer protocols. For example, existing network topologies are configured to enable network devices to exchange OSI layer 3 ("layer 3") and OSI layer 4 ("layer 4") communications via a WebSocket communication link to join or connect to a VPN. For example, for layer 3 communications, existing implementations allow for Internet Protocol (IP) Security (IPSec) communications to be sent between network devices across a WebSocket communication link within a VPN. Likewise, for layer 4 communications, existing implementations allow for Secure Socket Layer (SSL) communications to be sent between network devices across a WebSocket communication link within a VPN. The IPSec implementation for layer 3 communications and SSL implementation for layer 4 communications are commonly understood in the art.

These existing layer 3 and layer 4 solutions, however, do not extend to communications exchanged at OSI layer 7 ("layer 7") within a VPN using a WebSocket communication link. Layer 7 communications are commonly referred to as "application layer" communications. That is, though the existing solutions described above contemplate layer 3 and layer 4 communications exchanged via a WebSocket channel in a VPN, these solutions (or any other solutions heretofore contemplated) do not enable network devices in a VPN to exchange layer 7 communications with each other using a WebSocket link. Additionally, the existing layer 3 and layer 4 solutions lack resilience, since each network device participating in the layer 3 and/or layer 4 communication exchange needs to have a corresponding layer 3 and/or layer 4 processing modules installed (in hardware and/or software components). Thus, for example, IPSec solutions for exchanging layer 3 communications between network devices in a VPN via a WebSocket link are not effective if the network devices participating in the layer 3 communications do not have corresponding IPSec modules installed. Likewise, SSL solutions for exchange layer 4 communications between network devices in a VPN via a WebSocket link are not effective if the network devices participating in the layer 4 communications do not have corresponding SSL modules installed.

The techniques described herein alleviate these deficiencies by providing a mechanism for network devices in a VPN to exchange application (layer 7) communications with each other via a WebSocket communication link. Thus, the layer 7 communications described by the instant techniques are transmitted securely (by virtue of being authenticated and exchanged in the VPN, as described hereinafter) and bidirectionally (by virtue of being exchanged across the WebSocket communication link). Ultimately, these techniques, for example, allow a user to launch an application on a remote network device to connect to a site network server in order to exchange secure application layer communications in a VPN bidirectionally across a single communication link. This is beneficial, for example, in optimizing the communications exchanges between the network devices in the VPN, since communications that are sent in the application layer are exchanged as "messages" (or strings of bytes) as opposed to individual bytes themselves.

In order to enable application layer communications to be sent between the remote network device 102 and the network server device 104, the remote network device 102 and the network server device 102 are configured with TUN virtual network interface modules (shown at 122 and 128, respectively). The TUN virtual network interfaces 122 and 128 are modules that are available from operating systems such as Windows™, iOS™, UNIX™ and Linux. The TUN virtual network interfaces 122 and 128 function as virtual network ports that enable application programs to write packets as if they were writing to a physical network interface. That is, for the remote network device 102, the TUN virtual network interface 122 acts as a bridge between the VPN client 120 and the WebSocket endpoint 124. Likewise, for the network server device 104, the TUN virtual network interface 128 acts as a bridge between the gateway router/reverse proxy 130 (which allows access to one or more site nodes in a VPN, as described hereinafter) and the WebSocket endpoint 126. It should be appreciated that the TUN virtual network interfaces 122 and 128 may also be network tap ("TAP") interfaces that operate similarly to the TUN virtual network interfaces 122 and 128 in order to enable application programs to write packets from VPN modules (e.g., the VPN client 120 in the remote network device 120 and the gateway router/reverse proxy 130 in the network server device 104) to WebSocket endpoints. Thus, network TUN/network TAP modules that are already present on the operating systems of the remote network device 102 and the network server device 104 can be leveraged with the WebSocket endpoints to enable secure, bidirectional, application layer (layer 7) communications between the devices in the VPN.

The use of the TUN/TAP network modules enables a WebSocket VPN solution to be deployed as a "user space" application with very little kernel support when compared to existing solutions like IPSec. Specifically, the use of the TUN/TAP network modules enables the WebSocket VPN solution for mobile platforms that do not have native support for VPNs. It also allows as-needed use of scarce resources on mobile devices with the ability to remove VPN applications when not needed. The smaller footprint of WebSocket VPN clients compared to other VPN solutions expands their reach into a wide range of mobile devices for use in end-to-end applications that benefit from the bidirectional initiation of transactions in a secure, wide-area environment. Examples of such end-to-end applications are interactive gaming, industrial monitoring and control, enterprise resource management and mobile worker connectivity.

The use of the TUN/TAP modules together with the WebSocket endpoints also removes potential security administration roadblocks that may be present in layer 3 and layer 4 WebSocket VPN solutions. For example, in some layer 3 and layer 4 WebSocket VPN solutions, configurations need to be enabled on each network device to allow outgoing IPsec traffic to well-defined destinations. The layer 7 WebSocket VPN solution described hereinafter does not have such requirements.

As stated above, in order to effectuate the secure communications between the remote network device 102 and the network server device 104, a VPN is established between the remote network device 102 and the network server device 104. For example, when the remote network device 102 launches its VPN client 120 join the VPN via the Internet 108, the remote network device 102 exchanges authentication information of the VPN client 120 with the network server device 104. For example, the remote network device 102 provides the network server device 104 with a user name and password of the VPN client 120, and this information may be mapped by the network server device 104 to a VPN address associated with the VPN client 120. This mapping, for example, may comprise a table or list of site nodes that are included in the VPN that the VPN client 120 is attempting to access. For example, the VPN client 120 may have access to some but not all of the site nodes 110(1)-110(n), and the VPN address management database 132 maintains a list of the site nodes that are accessible by certain VPN addresses. The network server device 104, for example, may store VPN address information of several VPN clients (hosted by the remote network device or other network devices) in the VPN address management database 132, and upon receiving the authentication information from the remote network device 102 that is associated with the VPN client 120, the VPN address management database 132 may instruct the gateway router/reverse proxy 130 to allow access to one or more allowable site nodes. In one example, the gateway router/reverse proxy 130 may provide access to a pre-configured list of site nodes in the VPN hosting site 116 or may be a general purpose router that provides unrestricted access to the site nodes. Thus, by exchanging authentication information with the network server device 104, the remote network device 102 is granted access to one or more of the site nodes 110(1)-110(n) that it is allowed to access in the VPN.

In an example implementation of the node-to-site VPN communications exchanged along a bidirectional transport channel, the remote network device 102 may be a web-enabled mobile phone (e.g., an iPhone™) in communication with a cellular network. The mobile phone has a mobile application that a user has previously downloaded. The application allows the user to access the remote-office applications (directory servers, application servers, etc.) over a connection with a public Wi-Fi™ hotspot or home Wi-Fi™ subscription. The user launches the application on the mobile phone (e.g., by pressing an icon representing the application on the screen of the mobile phone), and upon doing so, the mobile phone triggers an on-demand VPN feature. The mobile phone, thus, exchanges layer 7 communications via the WebSocket VPN tunnel 106 to establish a VPN connection with a WebSocket gateway using, e.g., a certificate-based authentication. Thus, the user of the mobile phone is able to access the remote-office applications.

Figure 2:
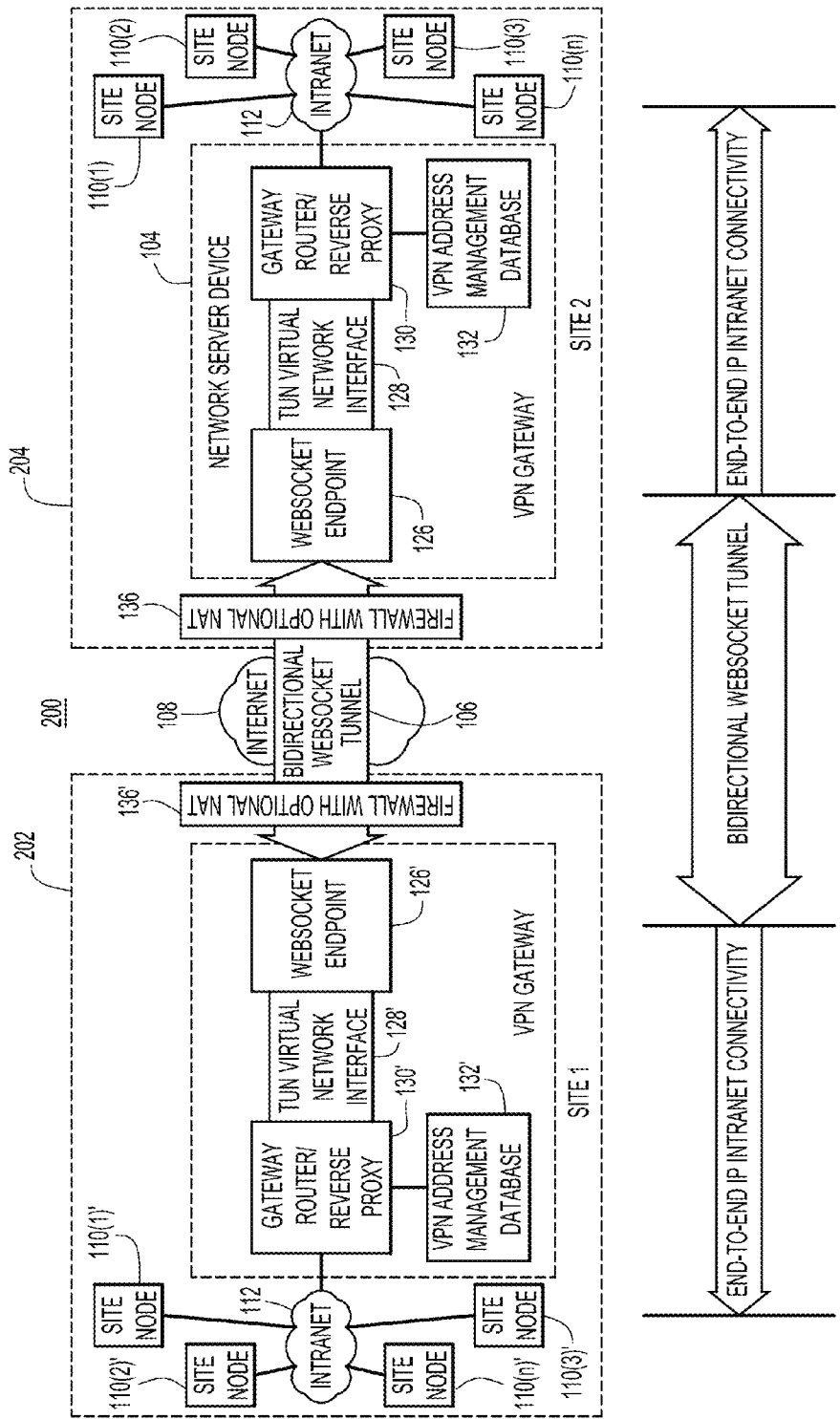
FIG. 2 shows an example network topology that enables site-to-site application layer communication exchange along a bidirectional transport channel.

Reference is now made to FIG. 2, which shows an example network 200 depicting secure site-to-site communications exchanged along a bidirectional transport channel. In FIG. 2, site 1, shown at reference 202, and site 2, shown at reference numeral 204, show components that are similar to the VPN hosting site 116 described in connection with FIG. 1. For example, site 1 and site 2 each have a network server device that hosts a WebSocket endpoint, TUN virtual network interface, gateway router/reverse proxy and a VPN address management database. The network server device of each site is connected to corresponding site nodes via corresponding intranet networks. In FIG. 2, the components in site 2 are shown with the same reference numerals as described in connection with VPN hosting site 116 in FIG. 1, and the components in site 1 are shown with the similar "prime" reference numerals. For example, the network server device of site 2 is shown at reference numeral 104, while the network server device of site 1 is shown at reference numeral 104', and so on. Site 1 and site 2 are configured to exchange bidirectional communications with each other via the communication link 106 and the public network (Internet) 108 in a similar manner as that described above in connection with FIG. 1. It should be appreciated that the term "site-to-site" communications refers to secure, bidirectional, application layer communications exchanged from network devices site 1 to network devices site 2 and from network devices site 2 to network devices site 1 in a VPN. These network devices in site 1 and site 2 may be the respective site nodes that are present at each site.

As described above, the site-to-site topology in FIG. 2 may represent an example where an enterprise has several branch offices that are present in different locations from one another. In FIG. 2, a first branch may be located at site 1 and a second branch may be located at site 2. Network devices in site 1 may want to communicate securely with network devices in site 2. These network devices may be represented by the site nodes depicted at site 1 and site 2. Thus, the remote network devices of each site may establish a VPN and may send secure, bidirectional, application layer communications to each other using the TUN virtual network interfaces and the WebSocket endpoints, using the techniques described in connection with FIG. 1 above. Thus, the site-to-site network topology 200 depicts multiple network devices to exchange secure, application layer communications with each other in a VPN via a WebSocket communication link.

Figure 3:
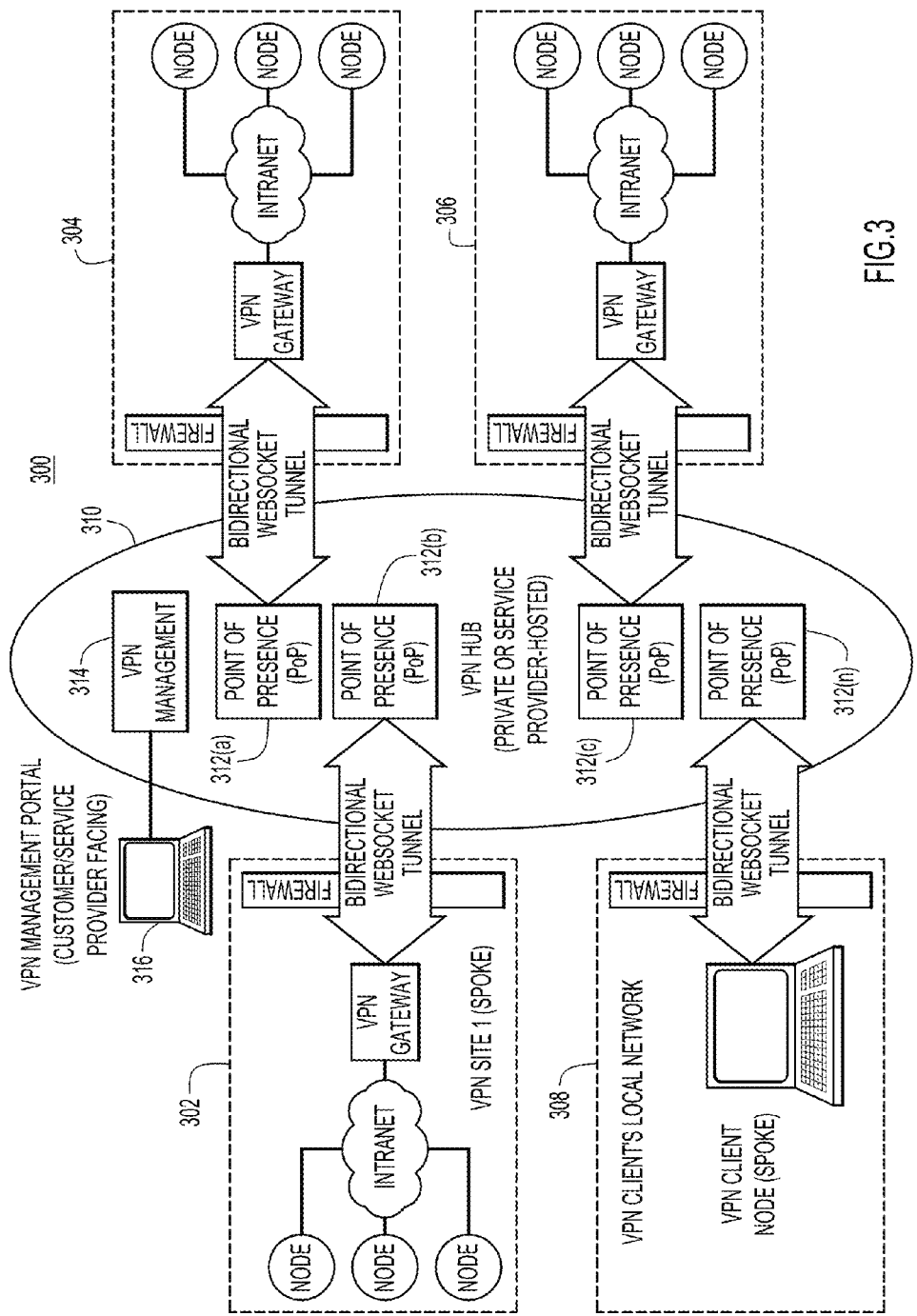
FIG. 3 shows an example hub-and-spoke network topology with a plurality of remote network devices and VPN hosting sites in bidirectional communication with each other via a center VPN hub.

Reference is now made to FIG. 3, which shows a hub-and-spoke VPN network topology 300. The hub-and-spoke VPN network topology 300 is a direct extension of the node-to-site network 100 in FIG. 1 and the site-to-site network 200 in FIG. 2. The hub-and-spoke topology 300 provides a significant reduction in the number of bidirectional communication links (e.g., tunnels) connecting a set of nodes and/or sites. In FIG. 3, several client nodes and network sites are integrated into a hub-and-spoke VPN. For example, FIG. 3 shows three VPN sites at reference numerals 302, 304 and 306. The VPN sites comprise components similar to the VPN sites shown in FIG. 1 and FIG. 2. FIG. 3 also shows a VPN client node at reference numeral 308, which has similar components as the remote network device 102 in FIG. 1. A VPN hub is shown at reference numeral 310, which comprises a plurality of Point of Presence (PoP) endpoints 312(a)-312(n). The PoP endpoints 312(a)-312(n) are, for example, WebSocket endpoints to enable bidirectional communications with the sites 302, 304 and 306 and the client node 308. The VPN sites 302, 304 and 306 and the VPN client node 308 utilize the techniques described above to enable secure, bidirectional, application layer communications with corresponding PoP endpoints 312(a)-312(n) in the VPN hub 310. The PoP endpoints 312(a)-312(n) receive the bidirectional, application communications and forward or route these communications to the appropriate destination site or node.

The VPN hub 310 has a VPN management module 314 that is linked to a VPN management portal 316 that is used to appropriately configure the VPN hub 310. For example, the VPN hub 310 provides the necessary routing for "inner" intra-net packets (e.g., IP packets). Organizations may create and manage their own hub-and-spoke VPN with an intermediate service provider network acting as the hub. It should be appreciated that the node-to-site network 100 of FIG. 1 and the site-to-site network 200 of FIG. 2 are integrated in the hub-and-spoke topology 300 of FIG. 3.

Reference is now made to FIG. 4, which shows an example diagram 400 of messages exchanged between a remote network device 102 and a network server device 104 in a node-to-site environment to enable secure, bidirectional, application layer communications in a VPN. It should be appreciated that these communications may also extend to the site-to-site environment and the hub-and-spoke environment described in connection with FIGS. 2 and 3, above. In the diagram 400 of FIG. 4, it is presupposed that the TUN virtual network interface 122 has binded with the WebSocket endpoint 124 of the remote network device 102 (as shown at reference numeral 402) and that the TUN virtual network interface 126 has binded with the WebSocket endpoint 126 of the network server device 104 (as shown at reference numeral 404). The message flows in FIG. 4 enable the remote network device 102 to exchange secure, bidirectional, application layer communications with the network server device 104 and a site node that resides behind the network server device 104.

At reference numeral 406, the VPN client 120 hosted by the remote network device 102 sends a VPN access request message to the WebSocket endpoint 124 of the remote network device 102. The WebSocket endpoint 124 of the remote network device 102 sends the VPN access request message, at reference numeral 408, to the WebSocket endpoint 126 of the network server device 104. The message is sent, for example, over the communication link 106 described in connection with FIG. 1. At reference numeral 410, the WebSocket endpoint 126 of the network server device 104 sends a request with address of the VPN client 120 to the VPN address management database 132. As described in connection with FIG. 1 above, the VPN address management database 132 may comprise a table that lists the access rights to site nodes for multiple VPN clients, including VPN client 120. At 412, the VPN address management database 132 sends the VPN address for the VPN client 120 to the WebSocket endpoint 126 of the network server device 104, which sends the VPN address to the WebSocket endpoint 124 of the remote network device 102 at reference numeral 414. At 416, the WebSocket endpoint 124 sends the VPN address to the VPN client 120.

At 418, the client application software 118 (e.g., a web browser or mobile application) sends layer 7 protocol frames to the VPN client 120. The VPN client 120, at 420, sends inner IP packets that encapsulate the layer 7 protocol frames to the TUN virtual network interface 122. At 422, the TUN virtual network interface 122 sends the inner IP packets to the WebSocket endpoint 124. The WebSocket endpoint 124 encapsulates the inner IP packets into WebSocket/TCP/IP outer packets at 424, and at 426 sends the encapsulated packets to the WebSocket endpoint 126 of the network server device 104. At 428, the WebSocket endpoint 126 de-encapsulates the WebSocket/TCP/IP packet and at 430 sends the inner IP packets to the TUN virtual network interface 128. The TUN virtual network interface 128 sends the inner IP packets to the gateway router/reverse proxy 130, which routes the packet at 434 to an application hosted by a site node 110 (e.g., one of the site nodes 110(1)-110(n) described in connection with FIG. 1).

In response to receiving the inner IP packets, the site node 110 sends a response communication to the VPN client 120. To accomplish this, as shown in FIG. 4, at operation 436, the site node 110 first sends encapsulated inner IP packets to the gateway router/reverse proxy 130, which sends the packets, at 438, to the TUN virtual network interface 128 of the network server device 104. The TUN virtual network interface 128 sends the packets, at 440, to the WebSocket endpoint 126 of the network server device 104, which encapsulates the packets into WebSocket/TCP/IP outer packets at 442. The outer IP packets with encapsulated inner IP packets are sent, at 444, to the WebSocket endpoint 124 of the remote network device 102, which de-encapsulates the packets at 446. At 448, the WebSocket endpoint 124 sends the inner IP packets to the TUN virtual network interface 122 of the remote network device 102, and at 450, the TUN virtual network interface 122 sends the inner IP packets to the VPN client 120. At 452, the VPN client 122 sends layer 7 protocol frames to the client application software 118.

Reference is made to FIG. 5, which depicts a packet 500 that is exchanged as a part of the secure, bidirectional, application layer communications. As shown in FIG. 5, a payload 502 is encapsulated with an encrypted inner IP packet header 504. The inner IP header is encapsulated with an encrypted WebSocket Protocol Data Unit (PDU) 506. The WebSocket PDU is encapsulated with an unencrypted outer TCP PDU 508, which is encapsulated with an unencrypted outer IP packet header 510. Thus, the packet may be interpreted as intranet IP packets encapsulated within Internet IP packets on a WebSocket tunnel. Intranet IP packets use a private IP addressing scheme (e.g., as defined in the IETF RFC 1918 standard) distinct from Internet IP addressing. The intranet IP packets and Internet IP packets may be IP version 4 (IPv4) packets or IP version 6 (IPv6) packets.

Reference is now made to FIG. 6, which shows an example chart 600 that compares the application layer WebSocket VPN solution described herein with layer 3 and layer 4 WebSocket solutions. As shown in FIG. 6, packets sent using the application layer WebSocket VPN solution described herein have a size of 62 bits, which is considerably smaller than most of the indicated layer 3 and layer 4 WebSocket VPN solutions. Thus, the application layer WebSocket VPN solution described hereinafter has slightly better header efficiency when contrasted with other VPN solutions, while maintaining sufficient security characteristics.

Figure 7:
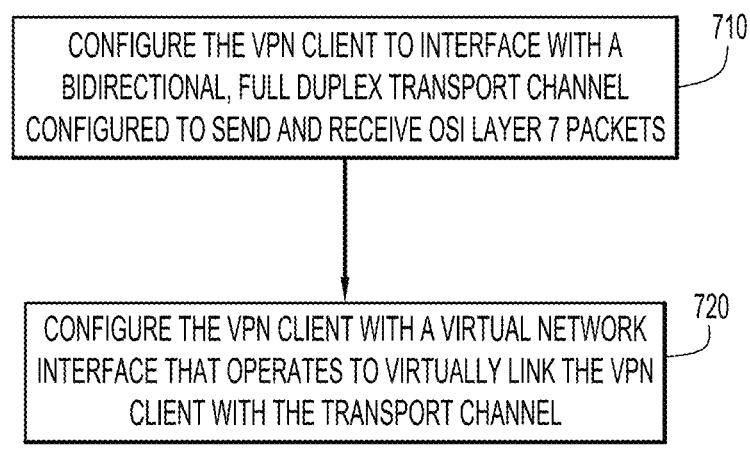
FIG. 7 shows an example flow chart depicting operations for enabling application layer packets exchanged bidirectionally between a remote network device and a VPN hosting site.

Reference is now made to FIG. 7, which shows an example flow chart 700 depicting operations for enabling application layer packets exchanged bidirectionally in a VPN. At operation 710, a source network device (e.g., the remote network device 102 in FIG. 1) that hosts a VPN client configures the VPN client to interface with a bidirectional, full duplex transport channel configured to send and receive application layer data packets. At operation 720, the source network device configures the VPN client with a virtual network interface that operates to virtually link the VPN client with the transport channel.

Figure 8:
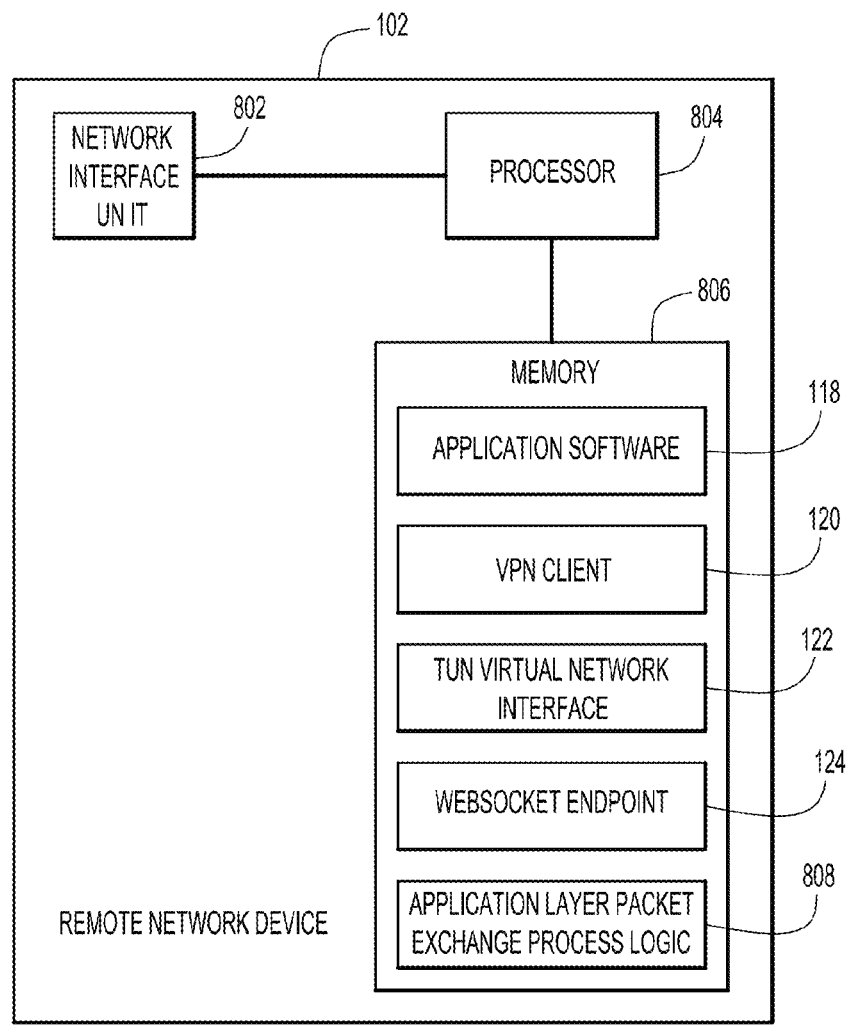
FIG. 8 shows an example block diagram of the remote network device that exchanges secure, bidirectional, application layer communications with a VPN hosting site.

Reference is now made to FIG. 8, which shows an example block diagram of the remote network device 102. The remote network device 102 comprises a network interface unit 802, a processor 804 and a memory unit 806. The network interface unit 802 is configured to send and receive secure, application layer packets bidirectionally as described by the techniques herein. The network interface unit 802 is coupled to the processor 804. The processor 804 is, for example, a microprocessor or microcontroller that is configured to execute program logic instructions (i.e., software) for carrying out various operations and tasks of the remote network device 102, as described above. For example, the processor 804 is configured to execute application layer packet exchange process logic 808 stored in the memory unit 806 to exchange secure, bidirectional, application layer packets in a VPN, according to the techniques described above. The functions of the processor 804 may be implemented by logic encoded in one or more tangible computer readable storage media or devices (e.g., storage devices, compact discs, digital video discs, flash memory drives, etc. and embedded logic such as an application specific integrated circuit, digital signal processor instructions, software that is executed by a processor, etc.).

The memory 806 may comprise read only memory (ROM), random access memory (RAM), magnetic disk storage media devices, optical storage media devices, flash memory devices, electrical, optical, or other physical/tangible (non-transitory) memory storage devices. The memory 806 stores software instructions for the application layer packet exchange process logic 808. Additionally, the memory stores software instructions for the application software 118, VPN client 120, TUN virtual network interface 122 and WebSocket endpoint 124, as described above. Thus, in general, the memory 806 may comprise one or more computer readable storage media (e.g., a memory storage device) encoded with software comprising computer executable instructions and when the software is executed (e.g., by the processor 804) it is operable to perform the operations described for the application layer packet exchange process logic 808.

The application layer packet exchange process logic 808 may take any of a variety of forms, so as to be encoded in one or more tangible computer readable memory media or storage device for execution, such as fixed logic or programmable logic (e.g., software/computer instructions executed by a processor), and the processor 804 may be an ASIC that comprises fixed digital logic, or a combination thereof.

For example, the processor 804 may be embodied by digital logic gates in a fixed or programmable digital logic integrated circuit, which digital logic gates are configured to perform the application layer packet exchange process logic 808. In general, the application layer packet exchange process logic 808 may be embodied in one or more computer readable storage media encoded with software comprising computer executable instructions and when the software is executed operable to perform the operations described hereinafter.

Figure 9:
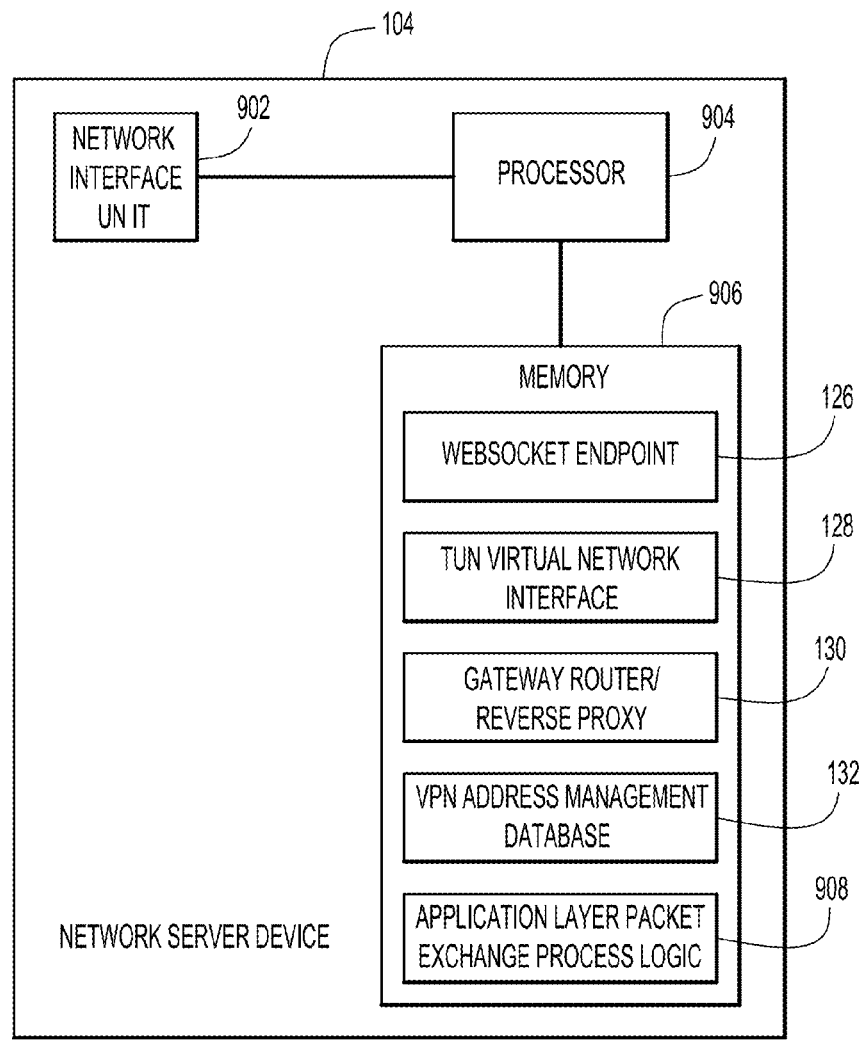
FIG. 9 shows an example block diagram of a network server device that exchanges secure, bidirectional, application layer communications with the remote network device and other network server devices.

Reference is now made to FIG. 9, which shows an example block diagram of the network server device 104. The network server device comprises a network interface unit 902, a processor 904 and a memory unit 906. The network interface unit 902 and the processor 904 are similar to the network interface unit 802 and the processor 804 described in connection with FIG. 8. The network server device 104 also has a memory unit 906 that stores software instructions for the application layer packet exchange process logic 908 to exchange secure, bidirectional, application layer packets with the remote network device 102 and with other network server devices 104 or PoP devices, as described by the techniques above. The memory unit also stores software instructions for the WebSocket endpoint 126, TUN virtual network interface 128, gateway router/reverse proxy 130 and VPN address management database 132, as described above. It should be appreciated that the application layer packet exchange process logic 908 may take a similar form as the application layer packet exchange process logic 808 described in connection with FIG. 8.

It should be appreciated that the techniques described above in connection with all embodiments may be performed by one or more computer readable storage media that is encoded with software comprising computer executable instructions to perform the methods and steps described herein. For example, the operations performed by the remote network device 102 and the network server device 104 may be performed by one or more computer or machine readable storage media (non-transitory) or device executed by a processor and comprising software, hardware or a combination of software and hardware to perform the techniques described herein.

In summary, a method is provided comprising: at a source network device that hosts a virtual private network client, configuring the virtual private network client to interface with a bidirectional, full duplex transport channel configured to send and receive Open Systems Interconnection application layer data packets; and configuring the virtual private network client with a virtual network interface that operates to virtually link the virtual private network client with the transport channel.

In addition, one or more computer readable storage media is provided that is encoded with software comprising computer executable instructions and when the software is executed operable to: configure a virtual private network client to interface with a bidirectional, full duplex transport channel configured to send and receive Open Systems Interconnection application layer data packets; and configure the virtual private network client with a virtual network interface that operates to virtually link the virtual private network client with the transport channel.

Furthermore, an apparatus is provided comprising: a network interface unit; a memory; and a processor coupled to the network interface unit and the memory and configured to: configure a virtual private network client to interface with a bidirectional, full duplex transport channel configured to send and receive Open Systems Interconnection application layer data packets; and configure the virtual private network client with a virtual network interface that operates to virtually link the virtual private network client with the transport channel.

The above description is intended by way of example only. Various modifications and structural changes may be made therein without departing from the scope of the concepts described herein and within the scope and range of equivalents of the claims.

What is claimed is:

1. A method comprising:
    at a source network device that hosts a virtual private network client, configuring, via a processor, the virtual private network client to interface with a bidirectional, full duplex, Open Systems Interconnection application layer communications transport channel, wherein the transport channel is configured to send and receive Open Systems Interconnection application layer protocol packets;
    configuring, via the processor, the virtual private network client with a virtual network interface that operates to virtually link the virtual private network client with the transport channel;
    encapsulating, at the Open Systems Interconnection application layer level, the Open Systems Interconnection application layer packets with virtual private network encapsulation; and
    sending the encapsulated application layer protocol packets over the transport channel via the virtual network interface.

2. The method of claim 1, wherein sending the encapsulated application layer protocol packets comprises sending the encapsulated application layer protocol packets to a virtual private network server hosted by a destination network device.

3. The method of claim 2, wherein sending the encapsulated application layer protocol packets to the virtual private network server hosted by the destination network device comprises sending the encapsulated application layer protocol packets to access destination network site nodes via a network tunnel interface.

4. The method of claim 1, wherein configuring the virtual private network client to interface with the bidirectional, full duplex transport channel comprises configuring the virtual private network client to interface with a WebSocket transport channel.

5. The method of claim 4, wherein configuring the virtual private network client to interface with the WebSocket transport channel comprises configuring the virtual private network client to interface with the WebSocket transport channel such that the WebSocket transport channel uses a single Transmission Control Protocol full duplex connection between the virtual private network client and the virtual private network server.

6. The method of claim 1, wherein configuring the virtual private network client comprises configuring the virtual private network client with at least one of a virtual network tunnel interface or a virtual network tap interface.

7. The method of claim 1, wherein the virtual private network client operates as a virtual private network router.

8. The method of claim 1, further comprising:
    sending authentication information to a virtual private network server hosted by a destination network device; and
    sending the application layer protocol packets to the virtual private network server if the virtual private network server authenticates the virtual private network client.

9. The method of claim 1, wherein encapsulating, at the Open Systems Interconnection application layer level, the Open Systems Interconnection application layer packets further comprises encrypting the Open Systems Interconnection application layer packets.

10. One or more tangible, non-transitory computer readable storage media encoded with software comprising computer executable instructions and when the software is executed operable to:
    configure a virtual private network client to interface with a bidirectional, full duplex, Open Systems Interconnection application layer communications transport channel, wherein the transport channel is configured to send and receive Open Systems Interconnection application layer protocol packets;
    configure the virtual private network client with a virtual network interface that operates to virtually link the virtual private network client with the transport channel;
    encapsulate, at the Open Systems Interconnection application layer level, the Open Systems Interconnection application layer packets with virtual private network encapsulation; and
    send the encapsulated application layer protocol packets over the transport channel via the virtual network interface at the Open Systems Interconnection application layer.

11. The computer readable storage media of claim 10, wherein the instructions operable to send the encapsulated application layer protocol packets comprise instructions operable to send the encapsulated application layer protocol packets to a virtual private network server hosted by a destination network device.

12. The computer readable storage media of claim 11, wherein the instructions operable to send the encapsulated application layer protocol packets comprise instructions operable to send the encapsulated application layer protocol packets across the network to the virtual private network server hosted by the destination network device to access destination network site nodes via a network tunnel interface.

13. The computer readable storage media of claim 10, wherein the instructions operable to configure the virtual private network client comprise instructions operable to configure the virtual private network client to interface with a WebSocket transport channel.

14. The computer readable storage media of claim 13, wherein the instructions operable to configure the virtual private network client to interface with the WebSocket transport channel comprise instructions operable to configure the virtual private network client to interface with the WebSocket transport channel such that the WebSocket transport channel uses a single Transmission Control Protocol full duplex connection between the virtual private network client and the virtual private network server.

15. The computer readable storage media of claim 10, wherein the instructions operable to configure the virtual private network client comprise instructions operable to configure the virtual private network client with at least one of a virtual network tunnel interface or a virtual network tap interface.

16. The computer readable storage media of claim 10, further comprising instructions operable to:
- send authentication information to a virtual private network server hosted by a destination network device; and
- send the encapsulated application layer protocol packets to the virtual private network server if the virtual private network server authenticates the virtual private network client.

17. The computer readable storage media of claim 10, wherein the instructions operable to encapsulate, at the Open Systems Interconnection application layer level, the Open Systems Interconnection application layer packets further comprise instructions operable to encrypt the Open Systems Interconnection application layer packets.

18. An apparatus comprising:
- a network interface unit;
- a memory; and
- a processor coupled to the network interface unit and the memory and configured to:
  - configure a virtual private network client to interface with a bidirectional, full duplex, Open Systems Interconnection application layer communications transport channel, wherein the transport channel is configured to send and receive Open Systems Interconnection application layer protocol packets;
  - configure the virtual private network client with a virtual network interface that operates to virtually link the virtual private network client with the transport channel;
  - encapsulate, at the Open Systems Interconnection application layer level, the Open Systems Interconnection application layer packets with virtual private network encapsulation; and
  - send the encapsulated application layer protocol packets over the transport channel via the virtual network interface at the Open Systems Interconnection application layer.

19. The apparatus of claim 18, wherein the processor is further configured to send the encapsulated application layer protocol packets across a network to a virtual private network server hosted by a destination network device.

20. The apparatus of claim 19, wherein the processor is further configured to send the encapsulated application layer protocol packets across the network to the virtual private network server hosted by the destination network device to access destination network site nodes via a network tunnel interface.

21. The apparatus of claim 18, wherein the processor is further configured to configure the virtual private network client to interface with a WebSocket transport channel.

22. The apparatus of claim 18, wherein the processor is further configured to configure the virtual private network client to interface with the WebSocket transport channel such that the WebSocket transport channel uses a single Transmission Control Protocol full duplex connection between the virtual private network client and the virtual private network server.

23. The apparatus of claim 18, wherein the processor is further configured to configure the virtual private network client with at least one of a virtual network tunnel interface or a virtual network tap interface.

24. The apparatus of claim 18, wherein the processor is further configured to encapsulate, at the Open Systems Interconnection application layer level, the Open Systems Interconnection application layer packets by encrypting the Open Systems Interconnection application layer packets.

* * * * *